United States Patent
Mitani et al.

(10) Patent No.: US 6,664,619 B2
(45) Date of Patent: Dec. 16, 2003

(54) LAMINATE FILM PACKAGED STORAGE DEVICE AND FABRICATING METHOD THEREOF

(75) Inventors: Masaya Mitani, Sendai (JP); Toshihiko Nishiyama, Sendai (JP); Hiroyuki Kamisuki, Sendai (JP); Gaku Harada, Tokyo (JP); Masato Kurosaki, Tokyo (JP); Yuji Nakagawa, Tokyo (JP); Tomoki Nobuta, Sendai (JP); Shinako Kaneko, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/265,797

(22) Filed: Oct. 7, 2002

(65) Prior Publication Data
US 2003/0071337 A1 Apr. 17, 2003

(30) Foreign Application Priority Data
Oct. 11, 2001 (JP) ........................................ 2001-314432

(51) Int. Cl.$^7$ .............................................. H01L 23/02
(52) U.S. Cl. ........................ 257/678; 257/787; 438/106
(58) Field of Search ................. 257/678, 690, 257/787, 790; 438/106, 121, 112, 124, 126, 127

(56) References Cited

U.S. PATENT DOCUMENTS 5,948,562 A * 9/1999 Fulcher et al. .............. 429/181

FOREIGN PATENT DOCUMENTS

| JP | 62-8932 B2 | 2/1987 |
| JP | 2-94619 A | 4/1990 |

* cited by examiner

Primary Examiner—Roy Potter
(74) Attorney, Agent, or Firm—Frishauf, Holtz, Goodman & Chick, P.C.

(57) ABSTRACT

A structure that is constituted by disposing a laminate film and a collector rubber with a metal terminal plate interposed therebetween and a structure that is constituted by disposing a laminate film and a collector rubber with a metal terminal plate interposed therebetween are disposed so as to sandwich a fundamental cell that is constituted by disposing a positive electrode layer and a negative electrode layer, respectively, on surfaces of a separator, the laminate films are fusion bonded at peripheries thereof, and thereby the fundamental cell is sealed in a package cell. In the laminate film, a window portion or an opening is disposed, and a metal terminal plate is partially exposed and used as an external connection terminal. Owing to this configuration, a laminate film packaged storage device in which sealing properties and the volume efficiency are improved can be provided.

13 Claims, 5 Drawing Sheets

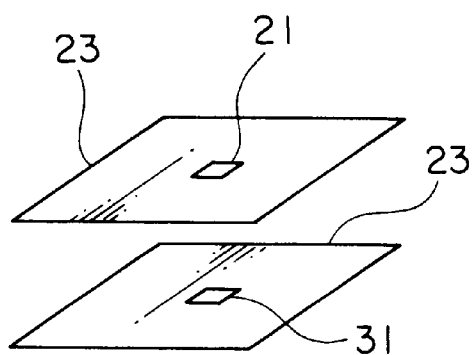 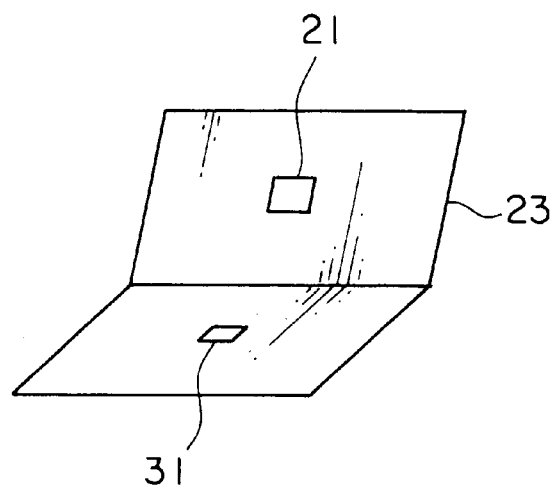
FIG. 3A          FIG. 3B
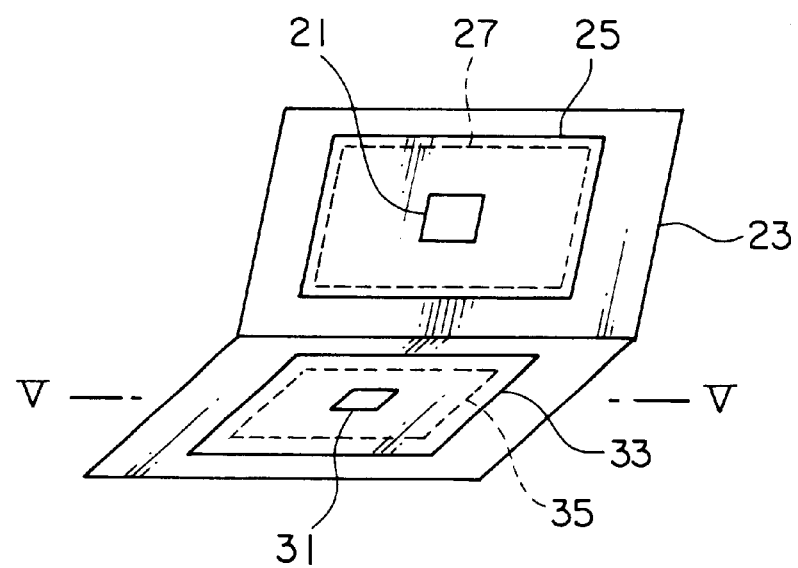
FIG. 4

LAMINATE FILM PACKAGED STORAGE DEVICE AND FABRICATING METHOD THEREOF

BACKGROUND OF THE INVENTION

1. Field of the Invention

The present invention relates to laminate film packaged storage devices and methods of fabricating the same, in particular to laminate film packaged storage devices, such as batteries and electric double layer capacitors whose sealing properties and a volume efficiency are improved, and methods of fabricating the same.

2. Description of the Related Art

In recent years, in the field of information and communications, smaller size and lighter weight tendency of portable devices has been advanced. In accordance with this tendency, storage devices such as batteries and electric double layer capacitors are smaller in size, lighter in weight and capable of more rapidly charging and discharging, and are in active development.

As a solution for the smaller size and lighter weight storage devices, it is proposed that a laminate film is formed by that a layer of polymer molecule film and a layer of metal foil are laminated and is used as a packaging material. Furthermore, in order to improve rapid charge and discharge properties, as a terminal, use is made of a plate of metal, such as copper small in conductive resistance. For instance, in JP-B-62-8932 (hereinafter referred to as a first existing technology), an electric double layer capacitor is proposed in which an opening is made in a polypropylene film of a laminate film and a layer of metal foil, for example aluminum, is exposed, the exposed layer of metal foil is brought into contact with a carbon electrode, and thereby forming an external terminal.

In the first existing technology, a problem exists that it is difficult to remove the polypropylene film alone although the volume efficiency of the electric double layer capacitor can be improved. Another problem exists that since the package is partially formed only of the aluminum foil, mechanical strength thereof is weak. In the above first existing technology, still another problem exists that because of the aluminum foil coming into contact with an electrolytic solution, the aluminum foil is eaten away with the electrolytic solution.

JP-A-2-94619 (a second existing technology) discloses a method of fabricating the electric double layer capacitors that enables improving the above first existing technology. In this technology, first, a polarizable electrode and a collector are integrally bonded with a conductive adhesive. In another process, a laminate film with a window is prepared. Against the window of the laminate film, the integrally bonded polarizable electrode and collector are disposed and appropriately temporarily bonded thereto followed by immersing in an electrolytic solution bath to impregnate the electrolytic solution, thereafter the laminate films are closely brought into contact.

In the existing second technology, in a separate process the opening is made in the laminate film, this laminate film is stuck to the polarizable electrode and collector that are integrally bonded with the conductive adhesive. Accordingly, the problems in the first existing technology can be overcome. However, another problem exists that since the electrolytic solution penetrates into between the collector and the laminate film, the collector and the laminate film cannot be brought into close contact.

SUMMARY OF THE INVENTION

It is an object of the present invention to provide laminate film packaged storage devices that can overcome the above problems of the existing technology and improve sealing properties and volume efficiency. It is another object of the present invention to provide methods of fabricating the laminate film packaged storage devices.

According to the present invention, there is provided a laminate film packaged storage device which includes a fundamental cell that is constituted by disposing a positive electrode layer and a negative electrode layer, respectively, on both surfaces of a separator, a first structure that is constituted by disposing a first laminate film having a first opening and a first collector rubber with a first metal terminal plate interposed therebetween and in which a first collector rubber surface is disposed so as to come into contact with a surface of the positive electrode layer of the fundamental cell, and a second structure that is constituted by disposing a second laminate film having a second opening and a second collector rubber with a second metal terminal plate interposed therebetween and in which a second collector rubber surface is disposed so as to come into contact with a surface of the negative electrode layer of the fundamental cell. In the above, the fundamental cell is sealed off in a package cell made of the first structure and the second structure by fusion bonding the first laminate film and the second laminate film at the peripheries thereof, and the first and second metal terminal plates, respectively, are partially exposed at the first and second openings.

In the above configuration of the laminate film packaged storage device of the present invention, the first laminate film is fusion bonded to the first metal terminal plate and the first collector rubber, and the second laminate film is fusion bonded to the second metal terminal plate and the second collector rubber. That is, each of the metal terminal plates is preferable to be surrounded by the corresponding laminate film and collector rubber.

In the above configuration of the laminate film packaged storage device of the present invention, surfaces of the first and second metal terminal plates exposed at the first and second openings are preferably used as terminals for use in external connection.

According to the present invention, there is provided a method of fabricating a laminate film packaged storage device which includes the steps of preparing a structure by disposing a collector rubber on the laminate film so as to cover the metal terminal plate followed by fusion bonding the metal terminal plate and the collector rubber onto the laminate film after a metal terminal plate is disposed on a laminate film having an opening so as to cover the opening thereof, disposing the structure on each of a positive electrode layer and a negative electrode layer of a fundamental cell that is constituted by sandwiching both surfaces of a separator, respectively, with the positive electrode layer and the negative electrode layer so that surfaces of the collector rubbers face each other, and fusion bonding two of the structures at peripheries thereof, and thereby sealing off the fundamental cell in a package cell.

In a laminate film packaged storage device of the present invention, since the metal terminal plate is surrounded by the laminate film and the collector rubber, the metal terminal plate is not eaten away with the electrolytic solution and the electrolytic solution can be hindered from leaking. Furthermore, since the laminate film is processed so as to have a partial opening and the metal terminal plate exposed in the opening can be used as an external connection terminal, a volume efficiency of the laminate film packaged storage device can be improved.

BRIEF DESCRIPTION OF THE DRAWINGS

FIG. 3A and FIG. 3B are perspective views showing an example of the structure of the laminate film of FIG. 1;

FIG. 4 is a perspective view showing a structure in which a metal terminal plate and a collector rubber are adhered to the laminate film of FIG. 3B;

DESCRIPTION OF THE PREFERRED EMBODIMENTS

In the following, embodiments of the laminate film packaged storage device of the present invention will be detailed with reference to the drawings.

Figure 1:
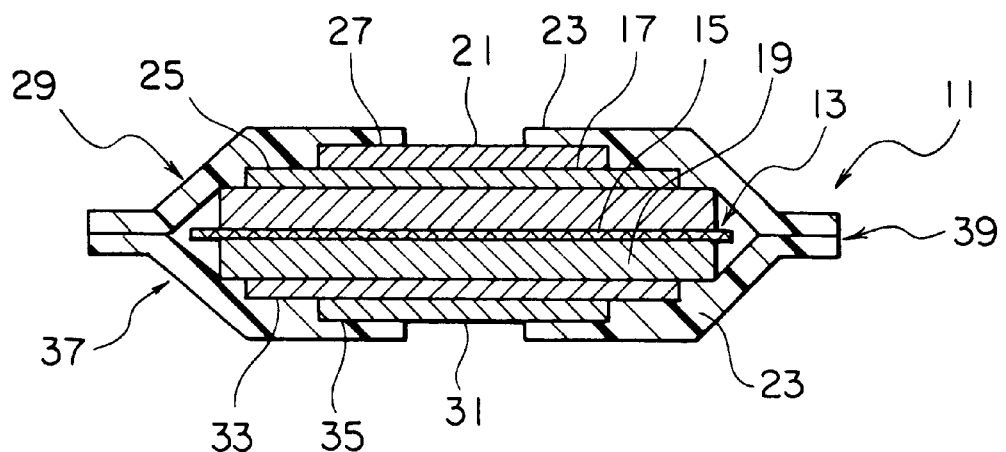
FIG. 1 is a sectional view showing a structure of a laminate film packaged storage device according to the present embodiment.
Figure 2:
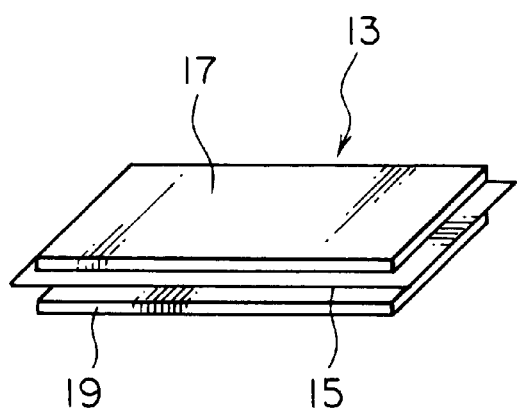
FIG. 2 is a perspective view showing a structure of a fundamental cell portion of FIG. 1.

Referencing to FIGS. 1 and 2, a laminate film packaged storage device 11 of an embodiment according to the present invention includes a fundamental cell 13 and a first structure 29 and a second structure 37.

The fundamental cell 13 is formed by disposing a positive electrode layer 17 and a negative electrode layer 19, respectively, on a top surface and a bottom surface of a separator 15.

The first structure 29 is formed by adhering a laminate film 23 having a window or an opening 21 and a collector rubber 25 with a metal terminal plate 27 interposed therebetween. Furthermore, the first structure 29 is configured so that a surface of a collector rubber 25 made of conductive rubber may be brought into contact with a surface of the positive electrode layer 17 of the fundamental cell 13.

The second structure 37 is formed by adhering a laminate film 23 having a window or an opening 31 and a collector rubber 33 with a metal terminal plate 35 interposed therebetween. Furthermore, the second structure 37 is configured so that a surface of a collector rubber 33 may be brought into contact with a surface of the negative electrode layer 19 of the fundamental cell 13.

The fundamental cell 13 is sealed in a package cell 39 that is formed by fusion bonding peripheries of the laminate films 23 of the first and the second structures 29 and 37. Into this package cell 39, an electrolytic solution is filled in.

In the windows 21 and 31 formed in the laminate films 23, the metal terminal plates 27 and 35 are exposed. Exposed surfaces of these metal terminal plates 27 and 35 are used as terminals for use in external connection. The windows 21 and 31 can be arbitrarily changed in their size, shape and position depending on applications.

As the laminate film 23, use can be made of a material in which a film of polymer molecule resin and a film of metal and a film of polymer molecule resin are laminated in this order. As the film of polymer molecule resin, for instance, polyolefin resins such as polyethylene, polypropylene and so on, nylon, vinyl acetate resin, and acrylic resin can be used. As the film of metal, use can be made of an aluminum foil and so on.

As a material for the collector rubbers 25 and 33, use can be made of a material in which a rubber material such as butyl rubber that cannot be eaten away by and is not permeable to the electrolytic solution is blended with a conductivity enhancement material, such as carbon or conductive polymer molecule followed by forming.

As a material for the metal terminal plates 27 and 35, use can be made of steel plate, aluminum plate and alloys thereof.

As a material for the positive electrode layer 17, polyindole shown in the following formula (1), other than this, organic or inorganic materials having redox reactivity, or materials containing active carbon having electrical storage capacity when coming into contact with the electrolytic solution can be used. For instance, when polyindole is used as a material (active material) of the positive electrode layer 17, vapor growth carbon as a conductive adjuvant and polyvinylidene fluoride as an electrode former are added thereto, followed by agitating and mixing in a blender, further followed by forming into a predetermined size with a hot press.

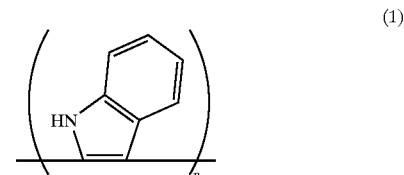

(1)

Furthermore, for the negative electrode layer 19, use can be made of polyphenyl quinoxaline shown in the following formula (2), other than this, organic or inorganic materials having redox reactivity, or materials containing active carbon having electrical storage capacity when coming into contact with the electrolytic solution.

For instance, when polyphenyl quinoxaline is used as a material (active material) of the negative electrode layer 19, vapor growth carbon as a conductive adjuvant and polyvinylidene fluoride as an electrode former are added thereto followed by agitating and mixing in a blender, further followed by forming into a predetermined size with a hot press.

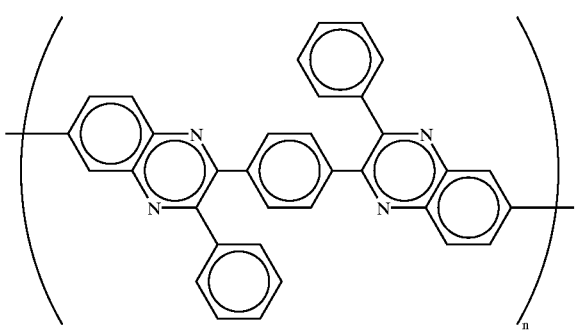

(2)

As the electrolytic solution, use can be made of proton acids, such as sulfuric acid, perchloric acid and so on that cause a redox reaction with difficulty.

In the laminate film packaged storage device 11 of the present invention that has a structure as shown in FIG. 1, the metal terminal plates 27 and 35, respectively, are adhered to and sandwiched by the laminate films 23 and the collector rubbers 25 and 33, and do not come into contact with the electrolytic solution in the cell. Accordingly, the metal terminal plates 27 and 35 are not eaten away with the electrolytic solution, and the electrolytic solution can be hindered from leaking from a fusion bonded portion.

FIG. 2 is a perspective view of the fundamental cell 13 of FIG. 1.

As shown in FIG. 3A, as the laminate film 23, use can be made of one set of two sheets that are disposed above and below the fundamental cell 13, respectively. Furthermore, as shown in FIG. 3B, use can be made of one having a shape that is obtained by folding one sheet into two.

When the metal terminal plates 27 and 35 and the collector rubbers 25 and 33 are disposed and fusion bonded onto the laminate film 23 shown in FIG. 3B, a structure shown in FIG. 4 comes to completion.

Figure 5:
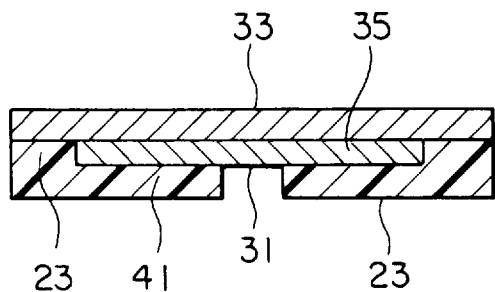
FIG. 5 is a sectional view along a V—V line of FIG. 4.

Referencing to FIG. 5, inside of the laminate film 23, the metal terminal plate 35 is disposed so as to clog the window 31. Furthermore, the collector rubber 33 is disposed so as to cover the metal terminal plate 35. The periphery of the collector rubber 33 is fusion bonded in a vacuum to the laminate film 23. Furthermore, to the metal terminal plate 35 the laminate film 23 is fusion bonded.

Subsequently, an implementation mode of a method for fabricating a laminate film packaged storage device of the present invention will be detailed with reference to FIGS. 6A and 6B and FIG. 7.

Figures 6A, 6B:
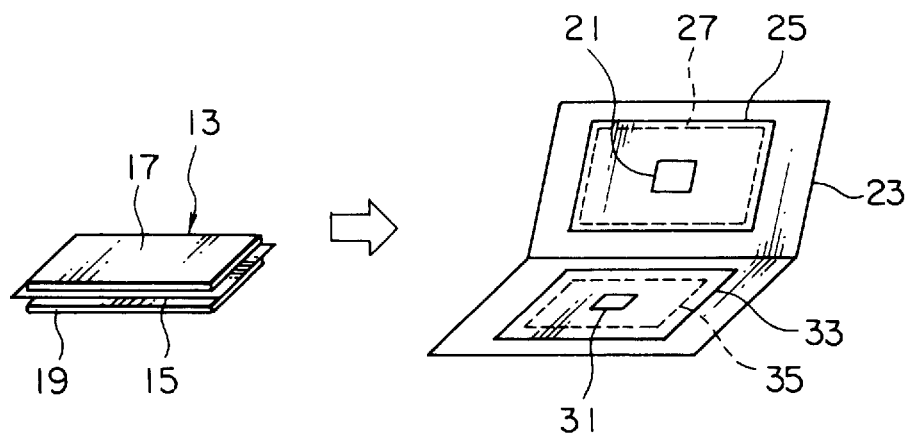
FIG. 6A and FIG. 6B are perspective views for explaining a method for use in fabricating the laminate film packaged storage device of the present invention.
Figure 7:
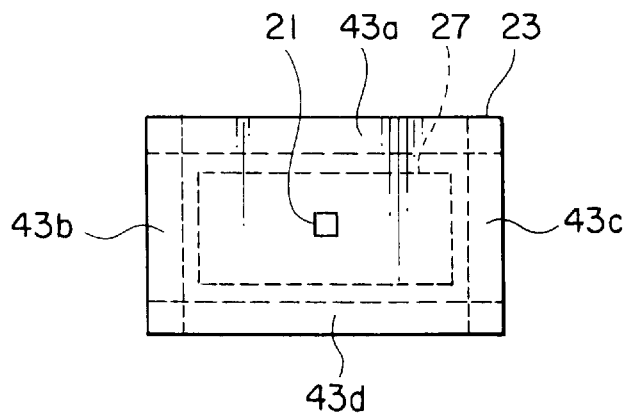
FIG. 7 is a plan view after the laminate film of the laminate film packaged storage device of the present invention is fusion bonded.

First, as shown in FIG. 6A, the positive electrode layer 17 and the negative electrode layer 19 are oppositely disposed with the separator 15 interposed therebetween, and thereby a fundamental cell 13 is prepared. Subsequently, as shown in FIG. 6B, the metal terminal plates 27 and 35 and the conductive rubbers as the collector rubbers 25 and 33 are sequentially disposed so as to cover the windows 21 and 31 of the laminate film 23 in which the windows 21 and 31 are formed by punching or the like. Thereafter, in a vacuum, the laminate film 23 and the conductive rubber are fusion bonded and the laminate film 23 and the metal terminal plates 27 and 35 are fusion bonded. The laminate film 23 is folded into two and the fundamental cell 13 is disposed therebetween. The surroundings (fusing portions 43a, 43c and 43d in FIG. 7) excluding a tip end portion (fusing portion 43b in FIG. 7) of the laminate film 23 are fusion bonded in a vacuum. Thereafter, a predetermined amount of the electrolytic solution is filled in followed by evacuating, and thereby the electrolytic solution is impregnated in the fundamental cell 13. A vacuum is broken once, then the fusion bonding portion 43b in the periphery of the laminate film 23 of FIG. 7 is fusion bonded under a vacuum followed by sealing off, and thereby a battery cell or laminate film packaged storage device is fabricated.

Next, methods for fabricating a laminate film packaged storage device of the present invention will be further detailed with embodiments. The present invention is not restricted to the following embodiments.

(Embodiment 1)

Twenty five % by weight of vapor growth carbon as the conductive adjuvant, and eight % by weight of polyvinylidene fluoride (average molecular weight: 1,100) as the electrode former are added to polyindole shown in chemical formula (1), these are agitated and blended in a blender followed by forming into a predetermined size with a hot press, and thereby a positive electrode layer 17 is prepared. Furthermore, twenty five % by weight of vapor growth carbon as the conductive adjuvant, and eight % by weight of polyvinylidene fluoride (average molecular weight: 1,100) as the electrode former are added to polyphenyl quinoxaline shown in formula (2), these are agitated and blended in a blender followed by forming into a predetermined size with a hot press, and thereby a negative electrode layer 19 is prepared.

Subsequently, as shown in FIG. 6A, the positive electrode layer 17 and the negative electrode layer 19 are oppositely disposed with the separator 15 interposed therebetween, and thereby a fundamental cell 13 is prepared. Subsequently, as shown in FIG. 6B, the windows 21 and 31 are formed at an upper and lower portions of the laminate film 23 to be folded into two by punching, copper terminal plates 27 and 35 and the collector rubbers 25 and 33 made of butyl rubber are sequentially disposed so as to cover the windows 21 and 31. Thereafter, the laminate film 23 and the collector rubbers 25 and 33 are fusion bonded in a vacuum. The laminated film 23 has a laminate structure of polypropylene, aluminum foil and polypropylene. The collector rubbers 25 and 33 are made of butyl rubber. The laminate film 23 and the metal terminal plates 27 and 35 are fusion bonded. The fundamental cell 13 is disposed between the collector rubbers 25 and 33 of the laminate film 23 that is obtained by fusion bonding the metal terminal plates 25 and 35 and the collector rubbers 25 and 33 shown in FIG. 6B, and the peripheries (fusion bonding portions 43a, 43c and 43d in FIG. 7) excluding the folding tip end (fusion bonding portion 43b in FIG. 7) of the laminate film 23 are fusion bonded in a vacuum. Because of the fusion bonding, the cell is sealed off and can have a structure that does not allow the electrolytic solution to leak. Thereafter, a predetermined amount of 40% by weight of sulfuric acid is filled in as the electrolytic solution followed by evacuating, and thereby the electrolytic solution is impregnated into the fundamental cell 13. A vacuum is broken once, then the fusion bonding portion 43b in the periphery of the laminate film 23 of FIG. 7 is fusion bonded under a vacuum followed by sealing off, and thereby a battery cell (laminate film packaged storage device) is fabricated. A width of the fusion bonding portion 43a through 43d is set at 3 mm. The volume efficiency of the battery cell fabricated according to the present embodiment is 54% and the product yield after assemblage of the cells is 98%.

(Embodiment 2)

In the present embodiment, with the exception for the width of the fusion bonding portion 43a through 43d being set at 2 mm, similarly to embodiment 1, the battery cells are prepared. Although the product yield after the cell assembly is 96%, that is, 2% less than embodiment 1, the volume efficiency is 60%, that is, 6% higher than the embodiment 1.

(Comparative Embodiment 1)

Figures 8A, 8B:
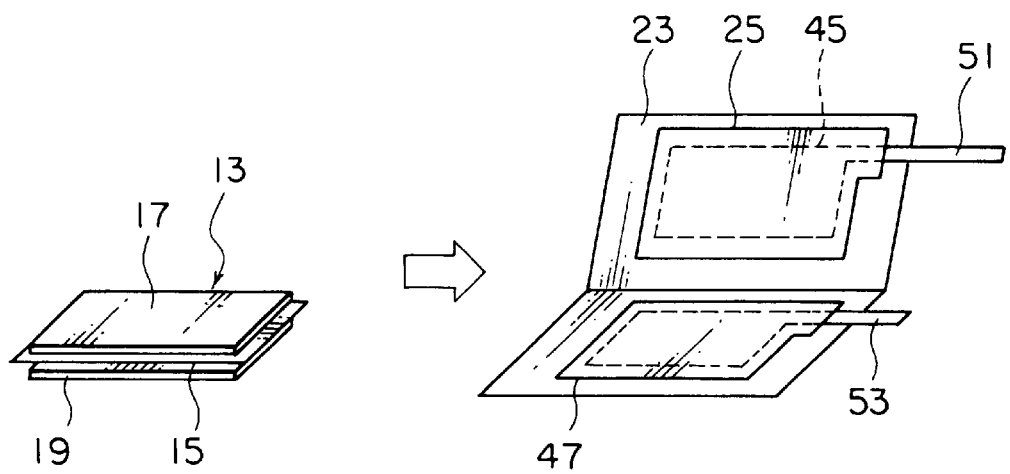
FIG. 8A and FIG. 8B are perspective views for use in explaining a method for fabricating a laminate film packaged storage device of a comparative embodiment.

Referencing to FIGS. 8A and 8B, as Comparative Embodiment 1, similarly to Embodiment 1, the positive electrode layer 17 containing polyindole and the negative electrode layer 19 containing polyphenyl quinoxaline are oppositely disposed with the separator 15 interposed therebetween, and thereby the fundamental cell 13 is formed (FIG. 8A). In the present comparative embodiment, without disposing the window to the laminate film 23, lead portions 51 and 53 for use in external connection are provided to metal terminal plates 45 and 47. As shown in FIG. 8B, on the laminate film 23, the metal terminal plates 45 and 47 and the collector rubbers 25 and 33 are sequentially disposed and fusion bonded in a vacuum.

Figure 9:
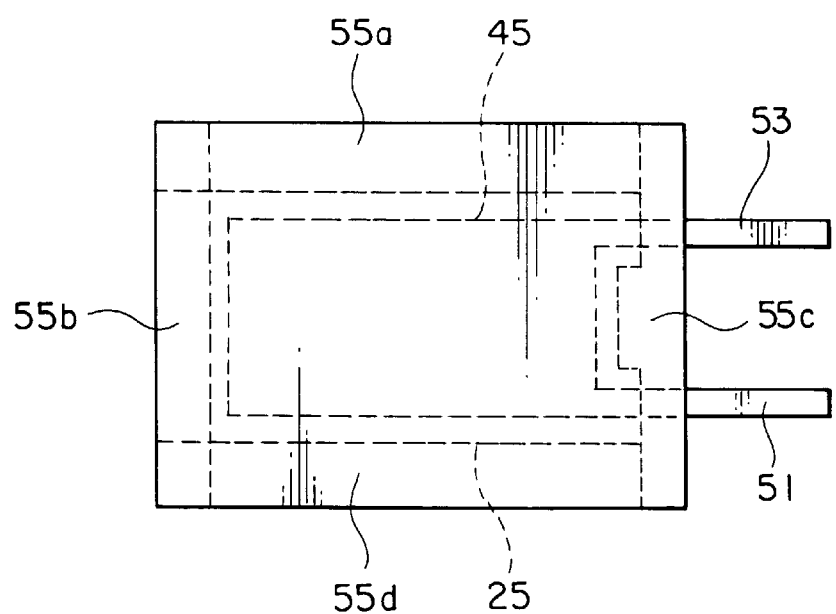
FIG. 9 is a plan view after the laminate film of the laminate film packaged storage device of the comparative embodiment is fusion bonded.

Next, the laminate film 23 is folded into two and the fundamental cell 13 is installed therebetween. Thereafter, three peripheries (fusion bonding portions 55a, 55b and 55c in FIG. 9) of the laminate film 23 are fusion bonded. Thereafter, a predetermined amount of an aqueous solution of 10% sulfuric acid is added as the electrolytic solution followed by evacuating, and thereby the electrolytic solution is allowed impregnating from a portion that is not fusion-bonded of the periphery of the laminate film 23 into a fundamental cell 50. A vacuum is once broken, then the portion that is not fusion-bonded of the periphery of the laminate film 7 (fusion bonding portion 55d in FIG. 9) is fusion bonded in a vacuum followed by sealing off, and thereby a battery cell is obtained.

Figure 10:
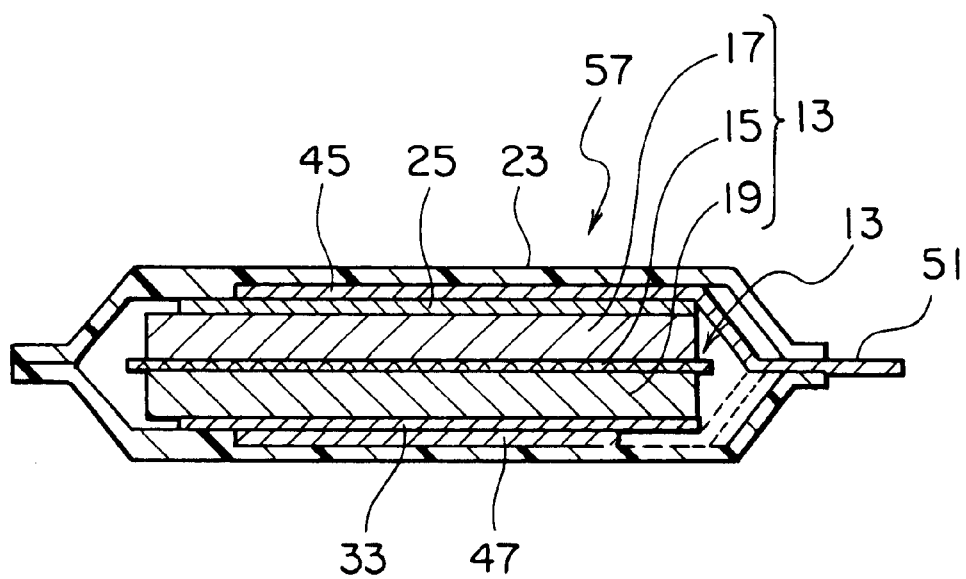
FIG. 10 is a sectional view of the laminate film packaged storage device of FIG. 9.

As shown in FIG. 10, in the battery cell prepared according to the present Comparative Embodiment, a width of sealing portion of the fusion bonding portions 55a, 55b and 55d is set at 3 mm and that of 55c at 4 mm.

The volume efficiency of the battery cell fabricated according to the present Comparative Embodiments is 43%, the product yield after cell assembly is 98%. In the battery cells obtained according to the present Comparative Embodiment, the volume efficiency is lower by 11% than that of Embodiment 1.

(Comparative Embodiment 2)

In the present comparative embodiment, a sealing width of the fusion bonding portion 55c is set at 3 mm instead of 4 mm in Comparative Embodiment 1, and other three peripheries of fusion bonding portions 55a, 55b and 55d are set at 2 mm instead of 3 mm in Comparative Embodiment 1. The volume efficiency of the battery cell fabricated according to the present comparative embodiment is 49% and the product yield after the cell assembly is 88%.

As explained above, in the present invention, since a lead terminal portion can be abolished and an outer dimension can be made smaller, the volume efficiency of the laminate film packaged storage device can be improved. In addition, since the laminate film and the metal terminal plate and the collector rubber are brought into close contact owing to the fusion bonding, sealing properties are improved, that is, the electrolytic solution can be inhibited from leaking, resulting in a decrease in fault after the assembly of the laminate film packaged storage devices.

What is claimed is:

1. A laminate film packaged storage device, comprising:
   a fundamental cell formed by disposing a positive electrode layer and a negative electrode layer on respective opposite surfaces of a separator;
   a first structure in which a first laminate film having a first opening and a first collector rubber are disposed with a first metal terminal plate interposed therebetween, and a surface of the first collector rubber is disposed so as to come into contact with a surface of the positive electrode layer of the fundamental cell; and
   a second structure in which a second laminate film having a second opening and a second collector rubber are disposed with a second metal terminal plate interposed therebetween, and a surface of the second collector rubber is disposed so as to come into contact with a surface of the negative electrode layer of the fundamental cell,
   wherein the fundamental cell is sealed in a package cell that is made of the first structure and the second structure by fusion bonding the first laminate film and the second laminate film at peripheries thereof,
   wherein first and second openings are formed on respective surfaces of the fundamental cell opposite to each other, and
   wherein the first and second metal terminal plates are partially exposed at the first and second openings, respectively.

2. A laminate film packaged storage device as set forth in claim 1, wherein the first laminate film is fusion bonded under a vacuum to the first metal terminal plate and the first collector rubber; and the second laminate film is fusion bonded to the second metal terminal plate and the second collector rubber.

3. A laminate film packaged storage device as set forth in claim 1, wherein the first and second collector rubbers are made of a butyl rubber material containing carbon or a conductive polymer molecule added as a conductivity enhancer.

4. A laminate film packaged storage device as set forth in claim 1, wherein the first and second metal terminal plates are made of one of copper, aluminum, an alloy of coppers and an alloy of aluminum.

5. A laminate film packaged storage device as set forth in claim 1, wherein the first and second laminate films are formed of a material in which a polymer molecule resin film, a metal foil and a polymer molecule resin film are laminated in order.

6. A laminate film packaged storage device as set forth in claim 1, wherein the first and the second laminate films are integrally formed by folding in two a film made of a material in which a polymer molecule resin film, a metal film and a polymer molecule resin film are laminated in order.

7. A laminate film packaged storage device as set forth in claim 1, wherein surfaces of the first and second metal plates exposed through the first and second openings comprise external connection terminals.

8. A method of fabricating a laminate film packaged storage device comprising:
   preparing a pair of structures each formed by disposing a metal terminal plate on a laminate film having an opening so as to clog the opening, disposing a collector rubber on the laminate film so as to cover the metal terminal plate, and fusion bonding the metal terminal plate and the collector rubber onto the laminate film;
   disposing the pair of structures on a positive electrode layer and a negative electrode layer of a fundamental cell, respectively, so that surfaces of the collector rubbers of the pair of structures face each other, wherein the fundamental cell is formed by disposing the positive electrode layer and the negative electrode layer on respective opposite surfaces of a separator; and
   fusion bonding the pair of structures at peripheries thereof to form a package cell, and thereby sealing the fundamental cell in the package cell.

9. A method of fabricating a laminate film packaged storage device as set forth in claim 8, wherein the first laminate film is fusion bonded to the first metal terminal plate and the first collector rubber in a vacuum, and the second laminate film is fusion bonded to the second metal terminal plate and the second collector rubber.

10. A method of fabricating a laminate film packaged storage device as set forth in claim 8, wherein the first and the second collector rubber are made of a butyl rubber material containing carbon or a conductive polymer molecule added as a conductivity enhancer.

11. A method of fabricating a laminate film packaged storage device as set forth in claim 8, wherein the first and second metal terminal plates are made of one of copper, aluminum, an alloy of copper, and an alloy of aluminum.

12. A method of fabricating a laminate film packaged storage device as set forth in claim 8, wherein the first and second laminate films are formed of a material in which a polymer molecule resin film, a metal film and a polymer molecule resin film are laminated in order.

13. A method of fabricating a laminate film packaged storage device as set forth in claim 8, wherein the first and second laminate films are integrally formed by folding in two a film made of a material in which a polymer molecule resin film, a metal film and a polymer molecule resin film are laminated in order.

* * * * *